United States Patent [19]

Boudreau et al.

[11] 3,872,430

[45] Mar. 18, 1975

[54] METHOD AND APPARATUS OF ERROR DETECTION FOR VARIABLE LENGTH WORDS USING A POLYNOMIAL CODE

[76] Inventors: Paul Emile Boudreau, 18 Chipmunk Ln., Ridgefield, Conn. 06877; Wayne Donald Brodd, 5012 Hermitage Dr., Raleigh, N.C. 27612; Robert Anderson Donnan, 1701 Curtis Rd., Chapel Hill, N.C. 27514

[22] Filed: Nov. 23, 1973

[21] Appl. No.: 418,351

[52] U.S. Cl. .................................... 340/146.1 AL
[51] Int. Cl. ........................................... G06f 11/12
[58] Field of Search ................ 340/146.1 AL, 172.5

[56] References Cited

UNITED STATES PATENTS

| | | | |
|---|---|---|---|
| 3,638,182 | 1/1972 | Burton et al. | 340/146.1 AL |
| 3,646,518 | 2/1972 | Weinstein | 340/146.1 AL |
| 3,648,238 | 3/1972 | Yarrington | 340/146.1 AL |

*Primary Examiner*—Malcolm A. Morrison
*Assistant Examiner*—David H. Malzahn
*Attorney, Agent, or Firm*—Dewey J. Cunningham

[57] ABSTRACT

In the transmission of variable length frames of digital information separated by one or more flag sequences, a block check is generated and appended to the information bits at the transmitter. The block check is generated by Exclusive OR'ing a predetermined non-zero number to the high order information bits and generating (n−k) check digits according to a cyclic error detecting code. The (n−k) check digits are Exclusive OR'd with an (n−k) bit non-zero number to produce the block check. At the receiver, the first mentioned non-zero number is added to the high order information bits and an (n−k) digit number is generated according to the same cyclic error detecting code used at the transmitter. This number is checked to see if it conforms to a predetermined number indicating error-free transmission. Utilizing the above approach, transmission errors in or near the flag sequence are detected, as well as those which may occur in the information field.

6 Claims, 8 Drawing Figures

METHOD AND APPARATUS OF ERROR DETECTION FOR VARIABLE LENGTH WORDS USING A POLYNOMIAL CODE

FIELD OF THE INVENTION

This invention relates to digital information processing systems and methods utilized therein, and more particularly to the detection of errors in such systems.

DESCRIPTION OF THE PRIOR ART

Much attention has been directed to the detection of errors that occur in the transmission of digital signals over noisy channels. Such channels may take the form of telephone lines subject to error impulses or any other imperfect medium used between a source and a sink.

There are a number of techniques that have been used to detect errors in digital signal messages. One of the more powerful approaches involves the use of cyclic codes. Such codes and equipment for implementing error detection systems utilizing them are described in a paper by W. W. Peterson and D. T. Brown beginning on page 228 of the January 1961 issue of Proceedings of the IRE. In the above article, Peterson and Brown discuss coding a message of $k$ binary digits by appending $n-k$ binary digits as a check and transmitting the $k$ information digits and then the $n-k$ check digits. One may think of the binary digits as coefficients of a polynomial in the dummy variable X.

A cyclic code is defined in terms of a generator P(X) of degree $n-k$. A polynomial of degree less than $n$ is a code polynomial acceptable for transmission if, and only if, it is divisible by the generator polynomial P(X). Only codes for which P(X) is not divisible by X are used.

To encode a message polynomial G(X), we divide $X^{n-k}$ G(X) by P(X) and then add the remainder R(X) resulting from this division to $X^{n-k}$ G(X) to form the code polynomial $X^{n-k}$ G(X)=Q(X) P(X)+R(X), where Q(X) is the quotient and R(X) the remainder. Since in modulo two arithmetic, addition and subtraction are the same:

$$F(X)=X^{-k}\,G(X)+R(X)=Q(X)\,P(X),$$

which is a multiple of P(X) and, therefore, a code polynomial. R(X) has degree less than $n-k$ and $X^{n-k}$G(X) has zero coefficients in the $n-k$ lower order terms. Thus, the $k$ highest order coefficients of F(X) are the same as the coefficients of G(X) which are the message symbols.

The low order $n-k$ coefficients of F(X) are the coefficients of R(X), and these are the check symbols.

In implementing a system using cyclic codes, an encoder and a decoder are provided at the transmitting and receiving ends, respectively. Typically the encoder and decoder are each implemented by way of a feedback shift register designed according to the particular polynomial to be used and having $n-k$ stages. Prior to beginning transmission, each such shift register is preset to zero.

At the encoder the $k$ information digits are multiplied by $X^{n-k}$ and then divider by the predetermined divisor and the remainder, i.e., the $n-k$ check digits, appended to the information digits. At the decoder, the entire frame comprising the received information digits and check digits are divided by the divisor. If there is a zero remainder in the decoder at the end of the division process, then correct transmission is indicated.

In transmitting variable length information fields in the above system, it is necessary to provide some means of separating adjacent frames of information. Various types of frame delimiters may be used. They are referred to herein as flags or flag sequences.

There are problems in such a system where errors occur in transmission in or near the flag sequences. Consider the following examples where F=the unique flag sequence, D=$a$ variable length data field, and BC=the block check.

EXAMPLE 1-A

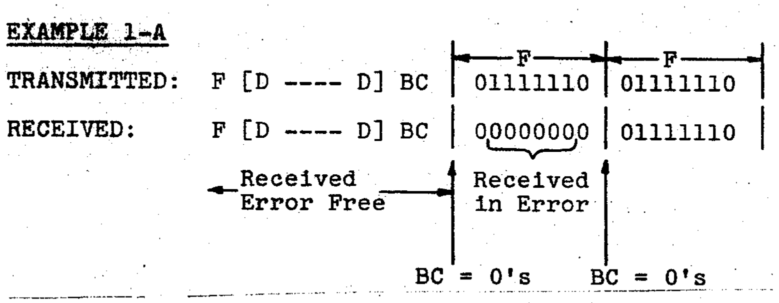

ERROR: Transmission error caused the ending flag sequence to be received as all "0's."

RESULT: Eight extra "0" bits are received in the frame with no block check error indication, i.e., BC="0's."

EXAMPLE 1-B

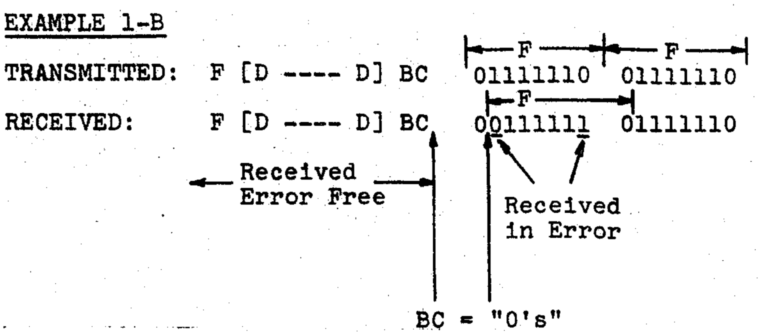

ERROR: Due to a 2 bit transmission error the ending flag sequence is received one bit displaced.

RESULT: One extra bit received in the frame with no BC error indication. The first bit of the received BC field is accepted as part of the information field.

EXAMPLE 1 CONCLUSION

There is a family of transmission errors of this type which may result in one to "*n*" extra bits being accepted as part of the information field with no BC error indication.

ERROR: Due to a 2 bit transmission error the single flag sequence delimiting two contiguous frames is received one bit displace.

RESULT: The first frame is received with an extra "0" bit included. The second frame is received without the leading zero bit. Both frames are received with no BC error indication.

EXAMPLE 2 CONCLUSION

There is a family of transmission errors of this type which may result in receiving frames with less than or greater than the number of bits transmitted with no BC error indication.

EXAMPLE 3-A

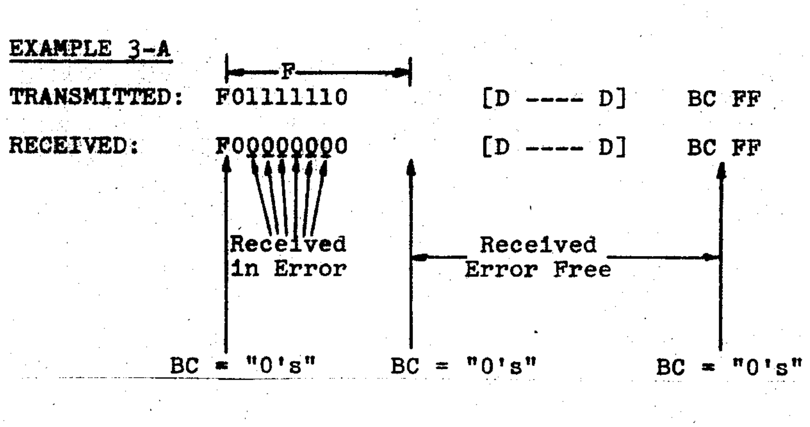

EXAMPLE 2-A

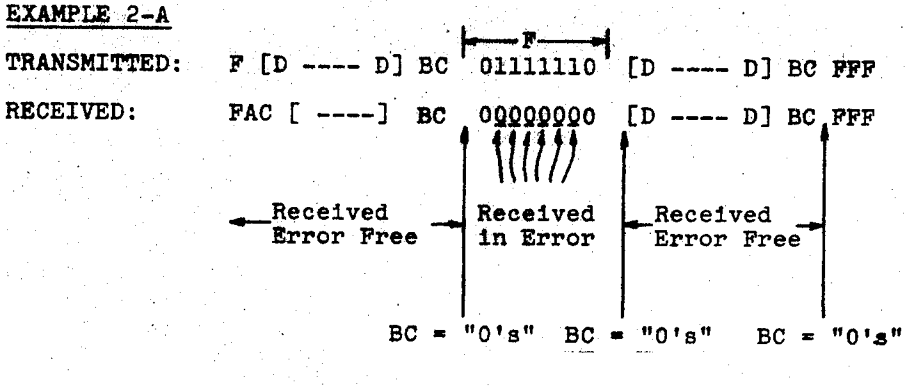

ERROR: Due to transmission errors the single flag sequence delimiting two contiguous frames was received as all "0's".

RESULT: The two contiguous frames, *n* and *n*+1, are received as a single frame with no BC error indication. Frame *n* was accepted with the following additional bits in the information field, (1) the BC field for frame *n*, (2) eight "0" bits, (3) the data field of frame *n*+1.

ERROR: The beginning flag sequence delimiter was received as all "0's" due to transmission errors.

RESULT: The beginning flag sequence delimiter which was converted to all "0's" is received as data. The received frame has eight extra zero bits with no BC error indication.

EXAMPLE 2-B

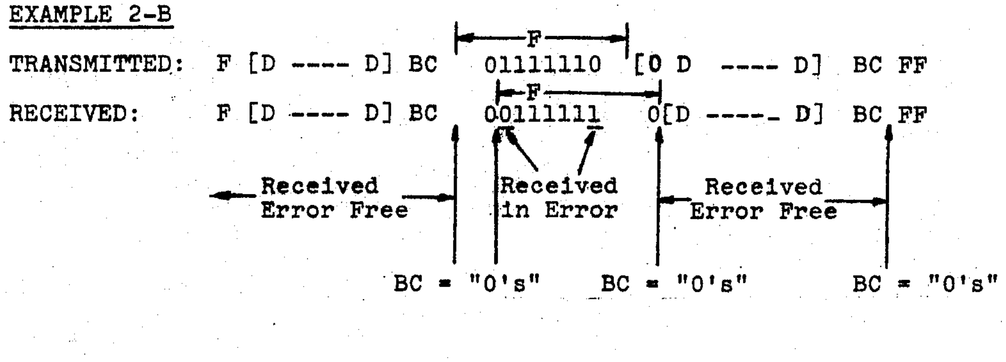

```
EXAMPLE 3-B
              |<-F----->|
TRANSMITTED:  F01111110    [0D ---- D]    BC FF

              |<-F----------->|
RECEIVED:     F00111111      0[D --- D]    BC FF
               ^     ^        ^                ^
                \   /         |                |
              Received        |<-Received----->|
              in Error        |  Error Free    |
                              |                |
                    BC = "0's"        BC = "0's"
```

ERROR: Due to a two bit error in the beginning flag sequence the receiver decodes a flag sequence one bit delayed using the first bit of the received address field as the last bit of the flag sequence.

RESULT: The first bit of the transmitted frame is not received as data and the received frame is displaced by one bit. The received frame has one less zero bit with no BC error indication.

EXAMPLE 3 CONCLUSION

There is a family of transmission errors of this type which result in bits being added to or deleted from the received frame. No BC error results.

From the above, it can be seen that there are a number of instances where transmission errors in or near the flag sequence will result in no error indications when the prior art systems described above are used.

SUMMARY OF THE INVENTION

To overcome the above problems, the present invention utilizes an encoder and decoder designed to multiply the information bits by $X^{n-k}$ and then divide by a predetermined polynomial. However, prior to generating the block check field, the encoder is preset to a non-zero condition rather than a zero condition as in the prior art. This is equivalent to Exclusive OR'ing a non-zero number to the high order bits of the information field which follow the flag sequence.

Following the division process at the encoder, the generated bits are Exclusive OR'd with some predetermined non-zero number to produce the block check bits BC for appending to the information bits. At the receiver, following receipt of the frame leading flag sequence, the decoder is preset to the same non-zero number to which the encoder was set, and the information bits and block check bits multiplied by $X^{n-k}$ supplied thereto. Again, this is equivalent to Exclusive OR'ing the same non-zero number to the high order bits of the information field which follow the flag sequence that was added at the encoder prior to the encoding operation. At the end of the decoding process, the decoder will have a predetermined non-zero number therein if the transmission is error free.

The unique non-zero number remaining in the decoder will always be the same following error-free transmission regardless of the number of bits in the message. The particular unique number is dependent on the particular non-zero number Exclusive OR'd with that generated at the encoder following the division process to produce the block check bits that were transmitted.

Since a particular predetermined number will reside in the decoder in error-free transmission, it will be seen that any bits that are added to the transmitted frame, whether they be "1's" or "0's," will result in changing the predetermined number that is supposed to be in the encoder at the end of a frame of information. Thus, using the above approach, each of the erroneous transmissions shown in the examples above will produce a number in the decoder at the end of a received frame that is different from the predetermined number.

A complete understanding of the above and the advantages thereof may be gained from a consideration of the following detailed description of a specific illustrative embodiment presented hereinbelow in connection with the drawings.

BRIEF DESCRIPTION OF THE DRAWINGS

Reference is made to the drawings in which.

DESCRIPTION OF THE PREFERRED EMBODIMENT

Figure 1:
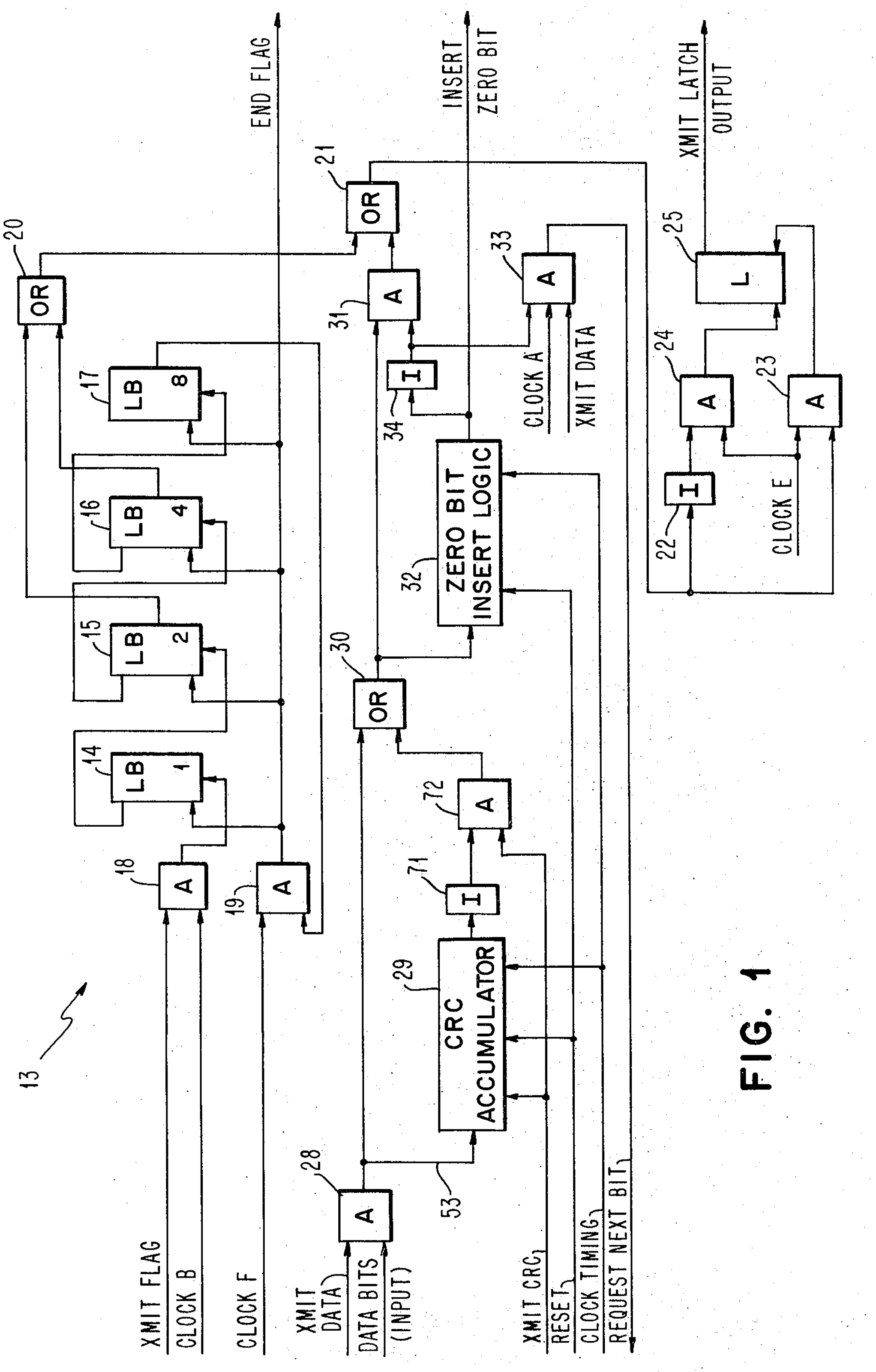
FIG. 1 is a block diagram of the transmitter portion of the invention.

Before describing the detailed aspects of the invention as illustrated in the drawings, certain criteria need to be identified with respect to the embodiment shown.

As previously mentioned, we are working with variable length messages or frames. Successive frames are separated by one or more flag sequences F. The flag sequence used, and its bit length, are matters of design choice. We have chosen an 8-bit flag sequence, although other bit lengths could be used, it being only necessary to modify the equipment to correspond. We have selected a particular flag sequence 01111110, but again others may be used.

The frame bits, i.e., those between two flag sequences, will be comprised of an information field and a block check (BC) field. For purposes of this description, we have chosen a 16 bit block check field. As previously indicated, the information field is of variable length. In the present embodiment, we have chosen to simplify the description of the invention by treating the entire information field as containing data bits D. However, it will be seen that the information field could be divided up to include an address field (A), a control field (C), and a data field (D). Under these circumstances, a transmission would be F, A, C, D, BC, F. It is usually desirable to have the address field and the control field to be of some predetermined length. For example, an 8-bit address and control field could be used. But the data field D may be of any variable length from frame to frame. The error control polynomial implemented herein is $X^{16}+X^{12}+X^{5}+1$, and is generally considered to be extremely powerful.

In the description that follows, various inputs and outputs appearing at particular points will be described as being positive or negative, or up or down. Since we are essentially dealing with two level signals, an output that is positive merely means that it is positive with respect to the other or negative level. The words "up" and "down" may be used interchangeably with the words "positive" and "negative" respectively.

In addition, the terminal or other type of apparatus to be used in providing the data to be transmitted or to utilize the data received, does not form a part of this invention. It is but necessary that they have appropriate means to provide the signals utilized by the transmitter and receiver at times when they are needed.

Figure 2:
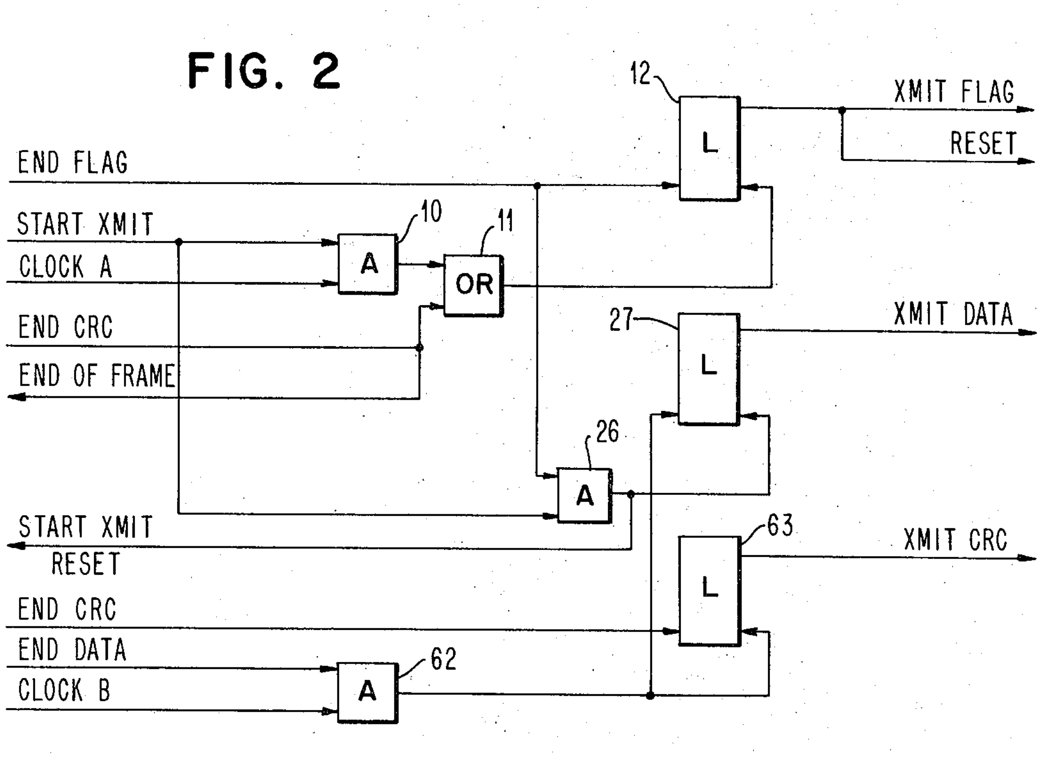
FIG. 2 is a block diagram of the sequence control circuit for FIG. 1.

Referring now to FIG. 1, there is shown the transmitting station which receives data from the particular terminal or other type of apparatus that is providing data. It will be noted that certain of the lines have legends thereon to indicated various control signals. FIG. 2 shows the sequence control logic for generating certain of these control signals.

Referring to FIG. 2, a START XMIT signal is received from the terminal. It is in the form of a positive pulse which is supplied to AND gate 10. At Clock A time a positive pulse is supplied from the gate through OR circuit 11 to a latch 12. This sets the latch and results in a positive pulse to form the XMIT FLAG and the RESET control signals.

Mention has been made of the Clock A signal. As in other machines in the past, clock signals are used to perform various sequential control functions. In the present invention, there are provided for each bit time positive clock pulses A, B, C, D, E, F, G and H. These are generated in conventional fashion by a free-running ring counter (not shown).

Since the first transmission to occur is the flag sequence (F), reference is made to the flag generator 13 in FIG. 1. This is essentially an eight bit counter comprising binary latches 14, 15, 16 and 17 connected as shown to receive input pulses from AND gates 18 and 19. All latches will be in their OFF condition prior to commencing flag generation. Thus, with the XMIT FLAG signal generated in FIG. 2, gate 18 will produce an input pulse at Clock B time to latch 14. AND gate 19 is kept off by a negative output from latch 17 until its state is changed. The next Clock B pulse causes latch 14 to go OFF. In so doing, it supplies a positive pulse to latch 15 to turn it ON. Additional Clock B pulses cause the counter to continue to operate in a well-known fashion until latch 17 turns ON. At this time, a positive voltage is supplied therefrom to AND gate 19. At Clock F time, a positive pulse is supplied from gate 19 to reset latches 14–17 and to also provide the END FLAG signal.

The outputs from latches 15 and 16 to the OR circuit 20 will go positive each time they are turned ON and will go negative each time they are turned OFF. These signals are connected to OR circuit 21 which is connected to AND gate 23 and through an inverter 22 to AND gate 24. AND gates 23 and 24 are used to set and reset, respectively, the latch 25.

To understand how the flag sequence 01111110 is generated at latch 25, it will be seen that when the flag generator 13 is reset to zero prior to commencing generation of the flag sequence, both of latches 15 and 16 will be OFF and the outputs therefrom through OR circuits 20 and 21 will result in a positive voltage being supplied from inverter 22 to gate 24. Thus, at Clock E time, a positive pulse will go from gate 24 to reset latch 25 OFF, if for any reason it was ON.

When a count of one is registered in the flag generator, the output of latches 15 and 16 to OR circuit 20 remain relatively negative. Thus, latch 25 will remain OFF so that the output therefrom is relatively negative, thus providing the initial "0" bit of the flag sequence. At a count of two in the flag generator, latch 15 will be ON so that a positive voltage is passed through OR circuits 20 and 21 to AND gate 23. At Clock E time, a positive pulse is supplied from AND gate 23 to set latch 25 ON, thus providing a positive output therefrom to produce a binary "1" as the second bit of the flag sequence. When a count of three is provided in the flag sequence generator, latch 15 stays ON and latch 25 therefore remains ON, thus providing a binary "1" as the third bit of the flag sequence.

When a count of eight is registered in the flag generator, both of latches 15 and 16 will be OFF, thus permitting the Clock E pulse to get through gate 24 to reset latch 25 to produce a "0" as the last bit of the flag sequence.

As previously mentioned, when latch 17 goes ON at the count of eight, it conditions gate 19 to pass Clock F to reset all of the latches 14–17 and produce the END FLAG signal. This signal resets latch 12 in FIG. 2 and results in a change in the output therefrom from positive to negative. Also, the END FLAG signal passes through gate 26 in FIG. 2 to provide a START XMIT RESET signal to the terminal to turn off the START XMIT signal received therefrom. At the same time the positive output of gate 26 is used to set latch 27 to provide the positive XMIT DATA signal to the input terminal and to condition AND gate 28 in FIG. 1 to receive the DATA BITS input from the terminal.

The DATA BITS supplied from the terminal pass through gate 28 and are supplied to the CRC accumulator 29 which is shown in greater detail in FIG. 3 and will be described later. The data also passes through OR circuit 30 to AND gate 31, the output of the latter being supplied through OR circuit 21 to the previously described circuit comprising devices 22–25 to produce the data output to be transmitted. It will be seen that the data thus follows the previously generated flag sequence.

Figure 4:
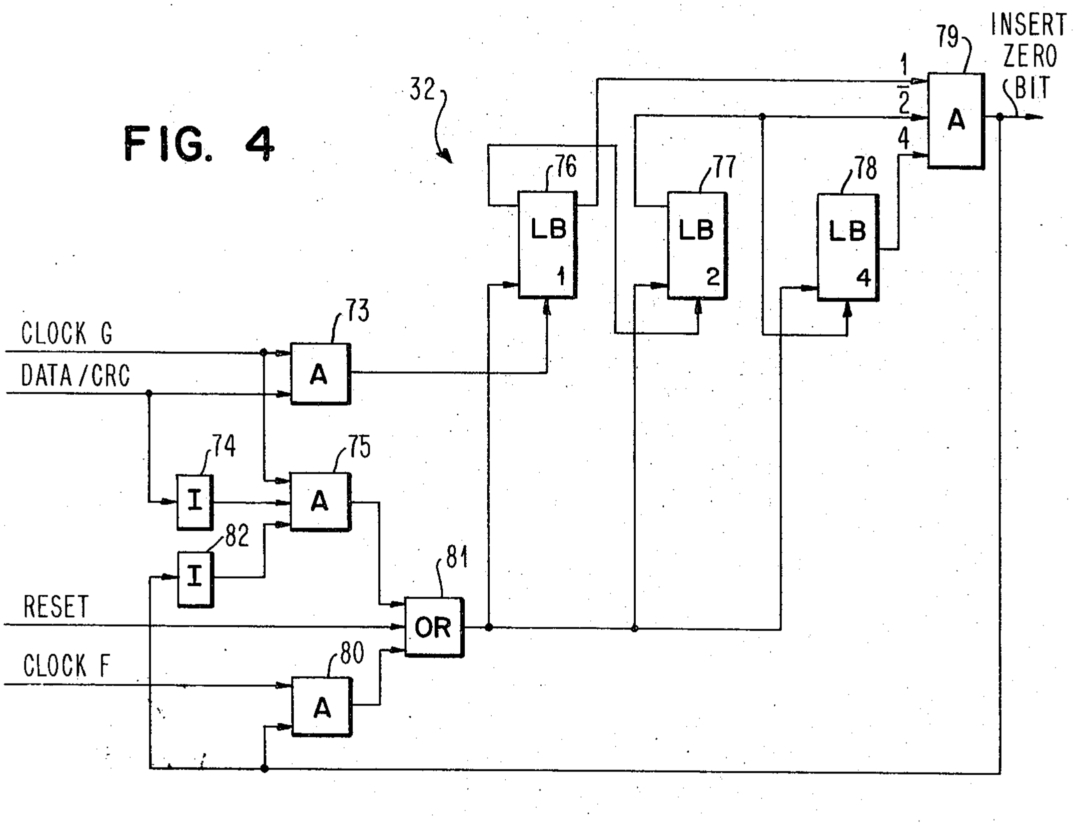
FIG. 4 is a detailed block diagram of the zero insert bit circuit used in FIG. 1.

The data passing through OR circuit 30 is also supplied to a zero bit insert logic arrangement 32 shown in greater detail in FIG. 4. The purpose of this latter arrangement is to assure that a flag sequence is not permitted to be transmitted within the data field. Thus, if there are five successive "1's" in the data bit input, the next bit, "0" or "1", will not be transmitted until after a "0" bit has been inserted, thereby preventing transmission of a flag sequence during the transmission of data bits.

In greater detail, it is assumed that when the terminal providing the data bits sends the START XMIT signal to initiate generation of the flag, the first bit of the data field is supplied to AND gate 28. It will not be able to get through until the XMIT DATA signal is received following generation of the flag sequence. At this time, whether the first bit is a "0" or a "1," it will result in causing latch 25 to stay OFF or go ON, respectively. For example, if it is a "0," the output of gate 28 will be down, thus resulting in the output of OR circuit 30, AND gate 31 and OR circuit 21 in being down. However, the output of inverter 22 will be up, thus allowing Clock E to supply a pulse 24 to keep latch 25 in the reset condition, i.e., it was in this condition already since the last bit of the flag sequence was a "0."

On the other hand, if the first data bit was a "1," the outputs from gate 28, OR circuit 30, AND gate 31 and OR circuit 21 will be up. This conditions AND gate 23 so that at Clock E time a positive pulse will be supplied to latch 25 to set it ON, thereby producing a positive signal at its output.

The implementation shown is such that the terminal providing the input data supplies a bit and then waits until the next bit is requested. The request for the next bit is accomplished by AND gate 33 in FIG. 1. Let us assume that the first bit has been received. There will be no need for zero bit insertion at this time so the output from box 32 will be down. This means that the output of inverter 34 will be up to condition gate 31 to pass data out to the transmit latch 25. At the same time, the output of inverter 34 conditions AND gate 33 to send a positive pulse at Clock A time to produce the REQUEST NEXT BIT signal which is sent back to the terminal. In response thereto, it sends the next bit which appears at gate 28.

It will be seen that at such time as the zero bit insert logic decides it is necessary to insert a "0" to prevent six successive "1's" in the data field, the output of inverter 34 will be down, thus inhibiting generating the REQUEST NEXT BIT signal from gate 33.

Figures 3, 7:
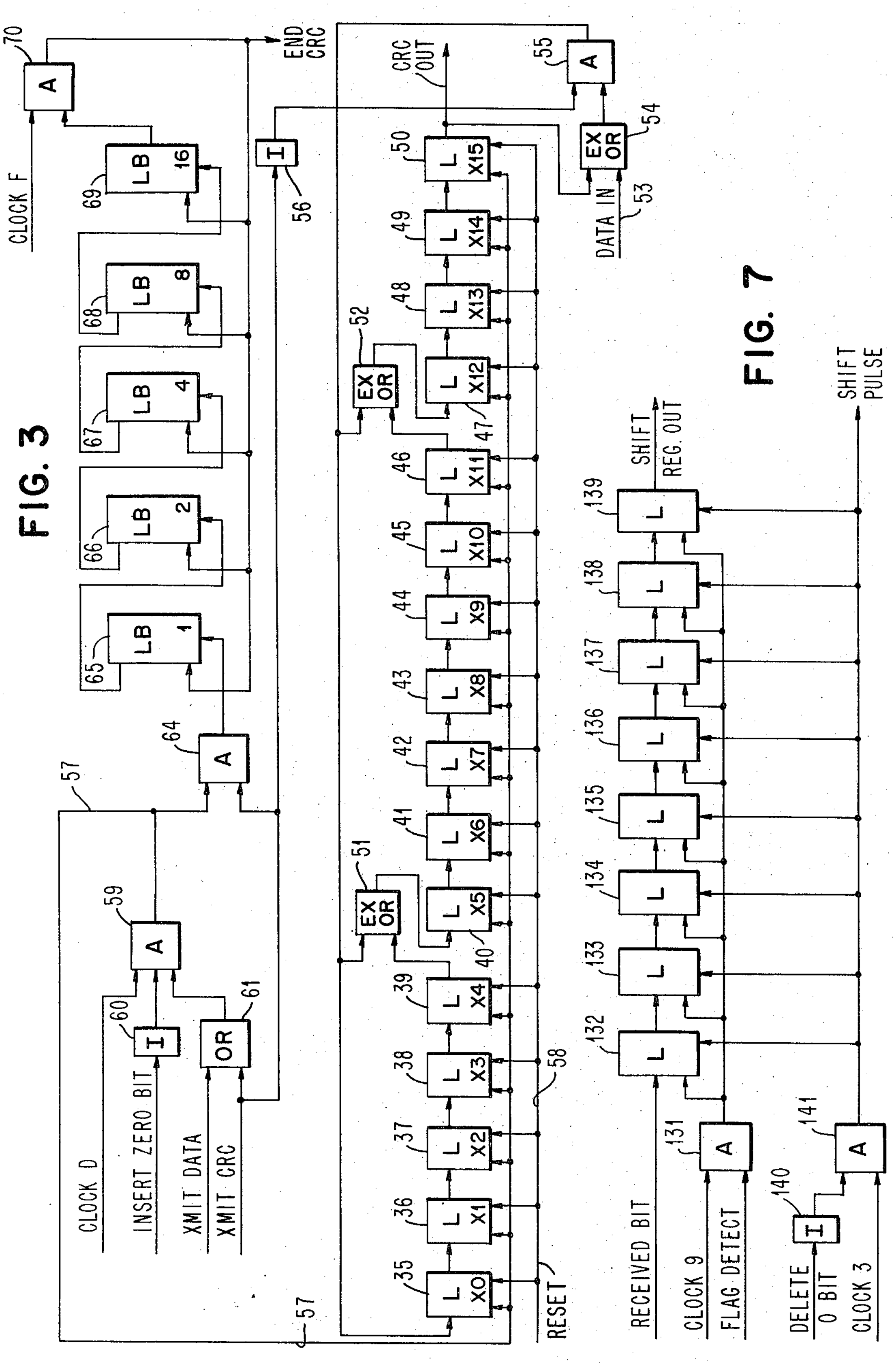
FIG. 3 is a detailed block diagram of the CRC accumulator shown in FIG. 1.
FIG. 7 is a detailed block diagram of a shift register for receiving the output of FIG. 5.

Referring now to the CRC accumulator 29, and more particularly to the detailed diagram thereof in FIG. 3, there is shown a feedback shift register arrangement for multiplying by $X^{n-k}$ and dividing the data bits by the polynomial selected in the instant case. In essence it is comprised of sixteen binary stages 35 through 50. EXCLUSIVE OR circuits 51, 52 and 54 are connected between certain stages as shown. The data input from AND gate 28 in FIG. 1 is supplied over line 53 to EXCLUSIVE OR 54 which is also connected to receive the output of stage 50 of the shift register. The output of EXCLUSIVE OR 54 is supplied as an input to AND gate 55. The other input to gate 55 is from an inverter 56 which is connected to receive the XMIT CRC signal, the generation of which will be later described. In any event, prior to generation of this latter signal the output of inverter 56 will be positive and allow gate 55 to pass therethrough the output of Exclusive OR 54. As shown, gate 55 provides inputs to stage 35 of the shift register and Exclusive OR circuits 51 and 52.

Shift pulses are provided on line 57 to each of stages 35 through 50. Also, a RESET signal is provided on line 58 to each of said stages. The shift pulses are provided on a clock time basis and the RESET signal is furnished after the block check has been generated and read out in order to prepare for receiving the next frame of data.

What has been described to this point with respect to FIG. 3 is well known in the prior art. It will be appreciated that differences from one feedback register arrangement to another in the prior art are determined by the particular error checking polynomial that is used. This particular arrangement is used to divide the data input by the polynomial $X^{16}+X^{12}+X^5+1$.

What is different, however, is the fact that we preset the shift register to some predetermined non-zero number. For example, as shown, we preset each stage by way of the RESET signal on line 58 to a binary "1" state. This equivalent to EXCLUSIVE OR'ing. 16 "1" bits to the 16 high order bits of the information to be received.

While we could have selected any other non-zero number, we have found the presetting to all "1's" to be an acceptable approach. In presetting to all "1's," we simply connect the RESET line to the same side of each stage, and use a reset signal of sufficient duration to assure its staying in the state to which it is set. If one desired to place certain of the stages in a "0" condition, the reset line to that stage would be connected to the opposite side. These are matters well known to those skilled in the art and need not be described in greater detail here.

As the first bit of data arrives at EXCLUSIVE OR 54, it is compared with the condition of stage 50 of the shift register. An EXCLUSIVE OR circuit is also well known. In Boolean algebra terms it is represented as ⊕. Briefly, however, it will provide a positive output if one or the other, but not both, of the inputs thereto is positive. Thus, if the first bit is a binary "0," a positive output will be supplied from EXCLUSIVE OR 54 since the output of stage 50 is positive (having been present to a "1" condition). On the other hand, if the first data bit was a binary "1," the output of EXCLUSIVE OR would be down, since both inputs were positive.

In further describing the operation of the shift register, let us assume the first data input represents a binary "1." Since the output of stage 50 is up due to being preset to a binary "1" state, the output as 54 will be down, i.e., $1 \oplus 1=0$. This results in the output of gate 55 being down. In this case, stage 35 will be changed to its "0" state. However, since the input to EXCLUSIVE OR 51 is up from stage 39 and down from the feedback line, an up input is supplied to stage 40 keeping it in its preset binary "1" state, i.e., $1 \oplus 0=1$. The same situation exists for EXCLUSIVE OR 52. Thus, after the first input representing a binary "1" has been read in, the number in stages 35 through 50 will be 0111111111111111.

On the other hand, if the first data input represented a binary "0," a positive output would have been supplied from EXCLUSIVE OR 54 through gate 55. This would cause the first stage 35 to remain in its binary "1" state. However, since EXCLUSIVE OR circuits 51 and 52 are eachlreceiving two positive inputs, a negative output would be provided therefrom, i.e., $1 \oplus 1=0$, and states 40 and 47 would be set to a binary "0" condition. Thus, after the first input bit (if a binary "0")

the condition of the shift register would be 1111101111110111.

It was previously mentioned that shift pulses were provided to the shift register over line 57 on a clock time basis. They are generated in the following manner. AND gate 59 is connected to receive the output of an inverter 60 and an OR circuit 61. Inverter 60 is connected to receive an INSERT ZERO BIT signal, the generation of which will be described hereinafter. It can be said that if a "0" is not to be inserted, the output of the inverter will be up, i.e., positive. If a "0" bit is to be inserted, the output of inverter 60 will be down, thus preventing gate 59 from producing a positive shift pulse at that time. OR circuit 61 receives the XMIT DATA and XMIT CRC signals. Thus, during data transmit time, the output of OR circuit 61 will be up.

From the above, it will be seen that during the time data is being transmitted, a pulse will be provided at Clock D time unless a zero bit is to be inserted. In the latter case, to shift pulse is provided while the INSERT ZERO BIT input to inverter 60 is up (positive).

At this point, it can be seen that data inputs representing binary "1's" and "0's" are received and operated on through the arrangement described above to produce various conditions in stages 35 through 50 of the shift register. The contents of this register represent a running remainder of the division process as bit after bit of the data field is supplied thereto.

After the terminal providing the data bits has sent the last bit of a data field, it sends a positive END DATA signal to AND gate 62 in FIG. 2 as a result of the next REQUEST NEXT BIT signal. This is read out of Clock B time to set latch 63, thereby providing a positive XMIT CRC signal. As shown, latch 63 is reset, after the check digits have been transmitted, by the END CRC signal. The latter signal is generated by the circuit shown in FIG. 3 in a manner to be later described.

Thus, we are now ready to shift out the check digits in the shift register shown in FIG. 3. This corresponds to the output from the CRC accumulator 29 shown in FIG. 1. The XMIT CRC signal provided in FIG. 2, as just described, is supplied through OR circuit 61 to gate 59 in FIG. 3 to provide the shift pulses on line 57 except when the INSERT ZERO BIT signal indicates that a "0" must be inserted. In addition, the XMIT CRC signal is supplied to inverter 56 which blocks gate 55 during the shift register readout operation. Also, the XMIT CRC signal is supplied to AND gate 64 so as to produce an output therefrom during each shift pulse generated at gate 59.

The output of gate 64 is supplied to a five stage binary counter which is designed, in a manner well known in the art, to count up to sixteen. The counter is comprised of binary latches 65 through 69. At a count of sixteen, a positive output is provided to AND gate 70 from the last stage 69, and at Clock F time a positive output is produced from gate 70 to provide an END CRC signal and to reset the counter to zero.

The positive END CRC signal is also supplied to OR circuit 11 in FIG. 2, the output of which is used to set latch 12 to generate another XMIT FLAG signal. This initiates generation of the frame ending flag sequence by the circuit shown in FIG. 1.

As previously mentioned, the check digits supplied on the CRC OUT line of FIG. 3 correspond to the output of the CRC accumulator 29 shown in FIG. 1. We have also described heretofore that an important aspect of this invention involves Exclusive OR'ing a nonzero number to the check digits prior to their being appended to the data bits for transmission to the receiver. In the embodiment shown herein, we have accomplished this by inverting the check digits. Thus, the outputs of CRC accumulator 29 are supplied to inverter 71. It will be understood that other techniques well known in the art can be used for Exclusive OR'ing some other non-zero number to the CRC digits to generate the block check field (BC) to be appended to the data field.

Referring to FIG. 1, the output of inverter 71 is connected to AND gate 72 which also receives the XMIT CRC signal. Thus, during the time that the XMIT CRC signal is positive, the output of inverter 71 is allowed to pass through gate 72 to OR circuit 30 and thence to gate 31. In the same fashion as previously described, the output of gate 31 is supplied to the transmit latch 25, the output of which is sent to apparatus, such as a modem (not shown), so that they can be placed in a form suitable for transmission over a communication line.

One of the circuits in the transmit logic shown in FIG. 1 has not yet been described in detail. This is the zero bit insert logic arrangement 32. As previously mentioned, the purpose of this arrangement is to assure that the flag sequence does not appear in the transmitted data field (D) or block check field (BC), as they appear at the output of latch 25. If this was not assured, a sequence of bits, in the data or block check fields appearing at the receiver, identical to the flag sequence would be erroneously accepted as such, thereby improperly indicating the end of a frame of bits.

The zero bit insert logic 32 is shown in detail in FIG. 4. Conceptually, this circuit is designed to provide an INSERT ZERO BIT signal any time five successive "1's" appear in the data or block check fields. Without this arrangement, the receiver could receive an unintended flag sequence.

The above is accomplished by use of a three stage binary counter comprising binary stages 76, 77 and 78. A RESET signal provided from latch 12 in FIG. 2 is supplied through OR gate 81 to reset stages 76–78 when the flag sequence is initiated. Each signal representing a binary "1" in the data field or block check field causes the counter to increment by a count of one. Each signal representing a binary "0" in the data field or block check field causes the counter to be reset to zero unless the counter has reached a count of five indicating that a "0" bit must be inserted.

The data field and block check field signals from OR circuit 30 in FIG. 1 appear on the line labeled DATA/CRC in FIG. 4. These signals are supplied directly to gate 73, and through an inverter 74, to gate 75. Each such signal representing a binary "1" results in a positive pulse as the output from gate 73 at Clock G time. This pulse from gate 73 is used to increment the counter by one. If a signal representing a binary "0" appears on the DATA/CRC line, a positive signal is supplied from inverter 74 to AND gate 75. Assuming for the moment that the counter has not counted to five, a positive pulse will be supplied from gate 75 through OR circuit 81 to reset all stages of the counter to an OFF condition. Thus, the counter will count successive "1's" and reset on each "0" except is indicated.

If the counter counts up to five before a binary "0" occurs, stages 76 and 78 will be ON and stage 77 will be OFF. Outputs from stages 76, 77 and 78 are selected such that at the aforementioned count of five, positive voltages will appear at AND gate 79 and produce a positive INSERT ZERO BIT signal. This positive signal is also supplied through AND gate 80 at Clock F time to OR circuit 81, the output of which will reset the counter to zero to begin the counting process thereafter on signals representing binary "1's" on the DATA/CRC line. It will be seen that a positive output from gate 79 will also, by way of inverter 82, inhibit gate 75. Thus, gate 75 is able to reset the counter upon receipt of signals representing binary "0's" on the DATA/CRC line except when a count of five exists in the counter.

Referring now to FIG. 1, it will be seen that the INSERT ZERO BIT signal from zero bit insert logic 32 is supplied to inverter 34, the output of which is connected to AND gates 31 and 33. Thus, when a positive INSERT ZERO BIT signal is produced, indicating that five "1" bits have occurred in succession, gates 31 and 33 are inhibited by the inverter 34. Thus, the AND gate 33 cannot request the next bit at Clock A time. While the sixth bit is still supplied to gate 31, the negative signal supplied from inverter 34 causes the output of gate 31 to go negative, thereby resulting in insertion of a "0" bit from latch 25. That is, when the output of AND gate 31 goes negative, the output of OR circuit 21 also goes negative, thereby causing the output of inverter 22 to go positive. Then, at Clock E time a positive pulse is supplied to latch 25 to reset it, thereby producing a negative output therefrom representing the inserted binary "0."

It will be remembered from FIG. 4 that following generation of the INSERT ZERO BIT signal the counter is reset to zero at Clock F time. This causes the INSERT ZERO BIT signal to go negative. At this time, the output of inverter 34 in FIG. 1 goes positive to permit the sixth bit to pass through gate 31.

The INSERT ZERO BIT signal is also supplied to inverter 60 in FIG. 3. When it goes positive, indicating that a zero needs to be inserted, the output of the inverter goes negative thereby inhibiting AND gate 59 to prevent a shift pulse from being supplied to the shift register. Also, gate 64 is inhibited so as to prevent adding a count into the CRC counter.

From the above, it will be seen that any time five successive "1" bits occur in the data field or block check field, a "0" bit is inserted and the sixth bit is held up until after the "0" bit has been inserted.

At this point, the flag sequence 01111110 has been generated followed by the data field (D), the block check field (BC) and the frame ending flag sequence 01111110. Thus, a full frame has been transmitted.

It will be seen that we have shown how to generate a block check field which is represented by the polynomial R'(X) which is equal to the remainder of the quantity $[X^{n-k} \cdot G(X) \oplus X^k K_1(X)]$ divided by P(X), this remainder then being Exclusive OR'd with $K_2(X)$. This is expressed by the equation: $R'(X) = [\text{Remainder}\,(X^{n-k} \cdot G(X) \oplus X^k K_1(X)/P(X))] \oplus K_2(X)$ where R'(X) is the polynomial representing the block check, X is the dummy variable in the polynomial representation of bits, $n$ is the number of bits between flags, $k$ is the number of bits in the data field, G(X) is the polynomial representing the $k$ data bits in the data field, $K_1(X)$ and $K_2(X)$ are each polynomials of degree less than $n-k$ representing non-zero constants, and P(X) is the generator polynomial of degree $n-k$.

Figures 5, 6:
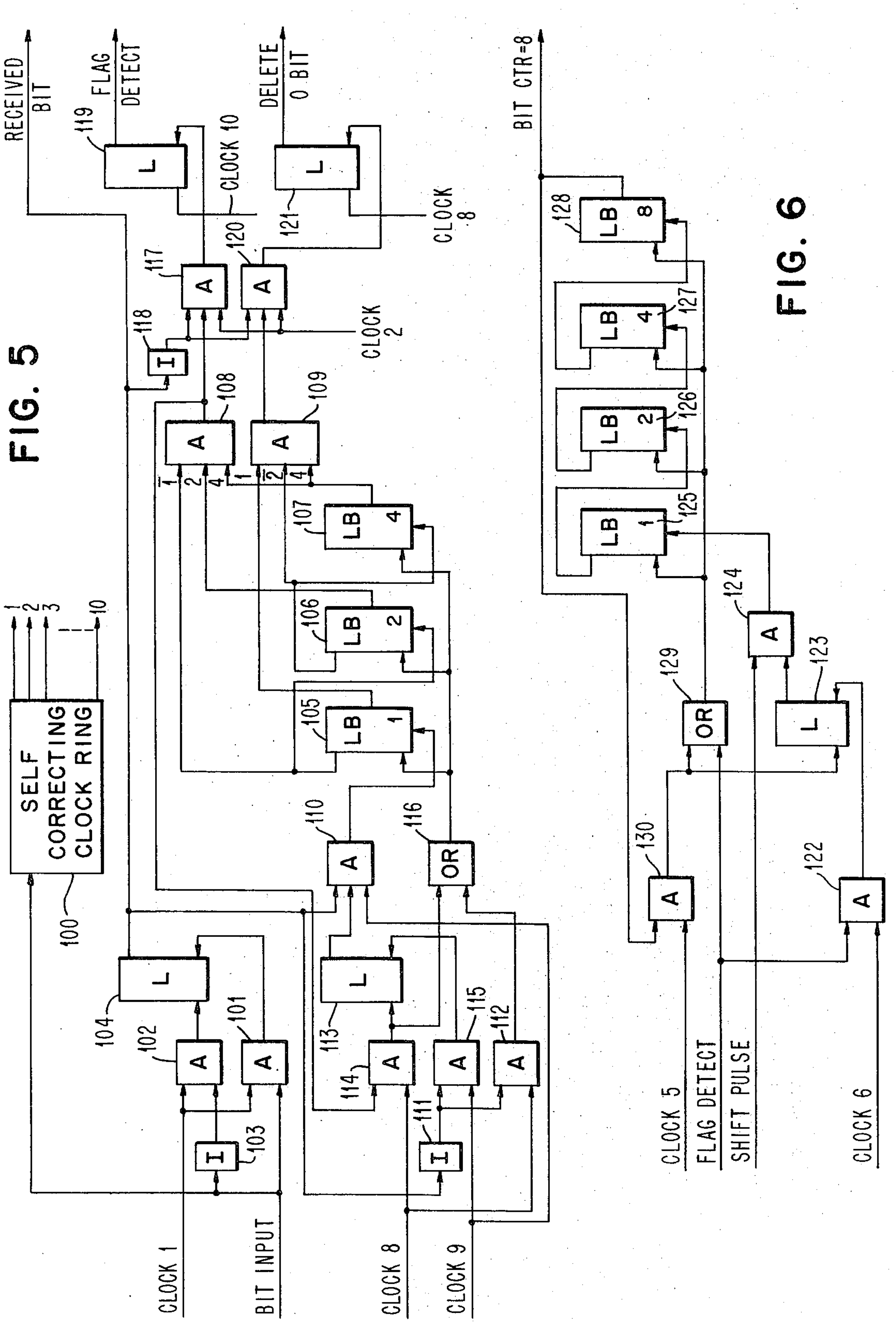
FIG. 5 is a detailed block diagram of the input section of the receiver.
FIG. 6 is a detailed block diagram of a counter to receive the output from FIG. 5.

It is now appropriate to describe the receiver apparatus. Referring to FIG. 5, the line BIT INPUT represents the input bits received from an appropriate modem (not shown) that is connected to the communication line to receive the incoming data. This BIT INPUT is connected to a self-correcting clock ring 100 which utilizes the transitions in the input bits to stay synchronized. The outputs of the ring are Clock 1 through Clock 10 pulses which occur one following the other on a bit time basis. Since it is desirable to sample the incoming data bits near the middle of the bit time, the ring synchronization is such that Clock 1 time occurs at the middle of the bit time.

The BIT INPUT line is connected to AND gate 101 and through an inverter 103 to AND gate 102. These two gates are sampled at Clock 1 time and the outputs therefrom used to control latch 104. Thus, a binary "1" input causes a positive level at the latch output and a binary "0" causes a negative level.

The output of latch 104 is termed RECEIVED BIT. This output is used to control a counter that looks for a flag sequence as well as the situation where a previously inserted zero needs to be deleted. The counter is comprised of binary stages 105, 106 and 107. The outputs of the stages are appropriately connected to AND gates 108 and 109, the first gate being adapted to detect six successive "1" bits and the latter gate being adapted to detect five successive "1" bits.

The output of latch 104 is connected to AND gate 110 and through inverter 111 to AND gate 112. A latch 113 is connected to be controlled by AND gates 114 and 115, the former gate being connected to receive the output of gate 108 and the latter gate receiving the output of inverter 111.

The operation of the counter comprising stages 105 through 107 is such that it is to count contiguous "1's" in the RECEIVED BIT output of latch 104, but be reset to zero by any "0." In describing how the flag sequence 01111110 is detected, it will be seen that the first "0" bit causes latch 104 to be in its reset condition resulting in a negative output from the latch, i.e., representing a binary "0". This negative output is inverted at 111 and supplied to gates 115 and 112. At Clock 8 time gate 112 sends a positive pulse through OR circuit 116 to reset the counter to zero. At Clock 9 time gate 115 sets latch 113 to provide a positive output to gate 110. Successive "1" bits of the flag will result in providing outputs from gate 110 to increment the counter. At a count of six, gate 108 will provide a positive output to gate 114 to reset latch 113 which blocks gate 110, and to OR circuit 116 to reset the counter. The output of gate 108 is also connected to gate 117 which also receives the output of an inverter 118. Thus, if the next bit is a "0," gate 117 will provide an output at clock 2 time to set latch 119, thereby providing a positive output as the FLAG DETECT signal. Latch 119 is reset at clock 10 time.

The above described counter operates in a similar fashion to detect situations where it is necessary to delete a "0" bit that was inserted at the transmitter in the manner previously described. Thus, when a count of five exists, gate 109 provides a positive output to gate 120. If the next bit is a "1" the output of inverter 118 will be negative and inhibit AND gate 120. Thus, gate 120 will provide an output at clock 2 time only when the next bit is a "0." The output of gate 120 sets a latch 121 to provide a positive DELETE "0" bit signal. This latch is reset at clock 8 time. Thus, it will be seen that a DELETE "0" BIT will not be produced during a flag sequence, but will be produced at such time as it is required to delete a previously inserted "0" bit.

From the above, it will be seen that if a flag sequence is received, a FLAG DETECT signal is provided. If five successive "1's" are received and the next bit is a "0," a DELETE "0" BIT is produced. These signals are used in a manner to be later described.

Referring now to FIG. 6, this circuit arrangement is designed to count the eight bits following the detection of a flag sequence. It is desired to learn whether a second flag is to be received. The FLAG DETECT signal, which goes positive upon detection of a flag sequence, is supplied through OR circuit 129 to reset stages 125 through 128 of a binary counter. The FLAG DETECT signal is also supplied to AND gate 122 which at clock 6 time sets latch 123 which conditions AND gate 124. Output of the latter is read out by a SHIFT PULSE to the first stage of the counter.

Thus, each SHIFT PULSE, which occurs each bit time other than when a "0" bit is received that must be deleted, increments the counter by one. It will be remembered from FIG. 5 that a DELETE "0" BIT is not produced during receipt of a flag sequence. At a count of eight, the output of stage 128 will go positive and condition AND gate 130 to reset the counter and to reset latch 123. It will be seen that if a second flag sequence occurred, i.e., following the first flag sequence, the FLAG DETECT signal would reset the counter before it reaches eight. Thus, a positive BIT CTR=8 signal occurs at the output of stage 128 only when the eight bits following a first flag sequence is not a second flag sequence. It will be seen that additional successive flag sequences will be handled in similar fashion.

Referring now to FIG. 7, when a FLAG DETECT signal is received, it is supplied through AND gate 131 at Clock 9 time to reset stages 132 through 139 of a binary shift register. The next RECEIVED BIT, obtained from latch 104 in FIG. 5, is supplied to stage 132. The shift register is shifted each bit time thereafter except when there is a DELETE "0" BIT signal. This is seen from the fact that the last mentioned signal is supplied through an inverter 140 to AND gate 141. Thus, if there is no indication that a zero bit should be deleted, gate 141 will generate the SHIFT PULSE at Clock 3 time. This is the same pulse that was supplied to AND gate 124 in FIG. 6.

The output of the shift register leaves from stage 139 and represents bits following the flag sequence, delayed, of course, by eight bit times. This delay, of course, allows the ending flag sequence to be detected as the last bit of the block check field is supplied to the decoder shown in FIG. 8.

Figure 8:
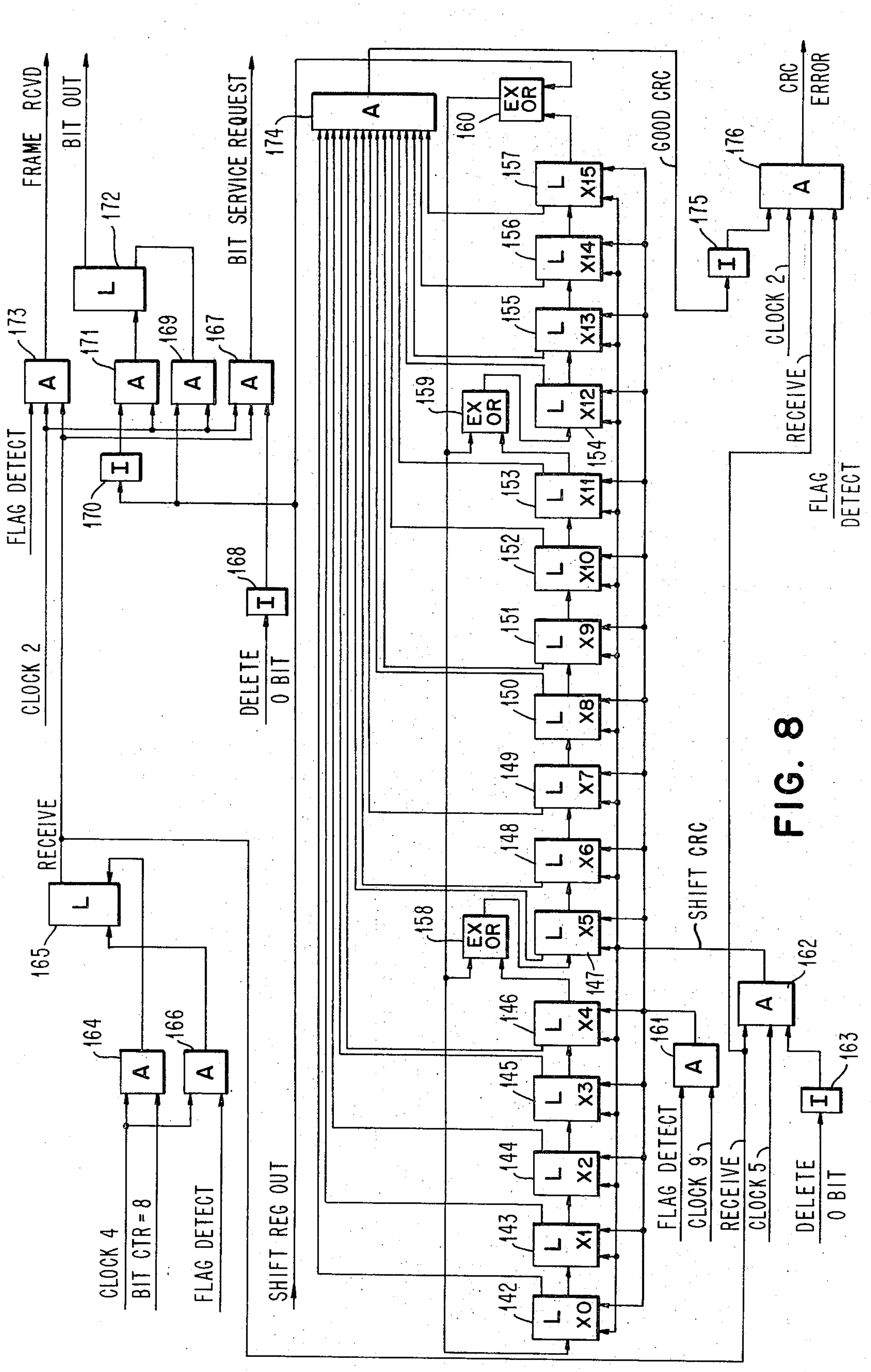
FIG. 8 is a detailed block diagram of the CRC accumulator and associated circuitry at the receiver.

Referring now to FIG. 8, there is shown the decoder in the form of an appropriate 16 stage feedback shift register, connected as shown, for the same error polynomial as that used at the transmitter. This shift register operates in a fashion generally similar to that used at the transmitter encoder and comprises stages 142 through 157 with EXCLUSIVE OR circuits 158, 159 and 160 connected as shown.

When the FLAG DETECT signal is produced at AND gate 161, which is read out at Clock 9 time, the stages of the shift register are preset to the desired non-zero number. As previously explained, in this implementation, we have chosen to preset to all "1's." Thus, all stages of the shift register are set to an ON condition. While other non-zero numbers could be used, it is necessary that the same number be used here as in the encoder shift register.

The SHIFT REGISTER OUT signal provided from FIG. 7 represents the input data and is supplied to EXCLUSIVE OR circuit 160. It is desired to shift the shift register for each bit time except when a "0" bit is to be deleted. This is accomplished by AND gate 162 to which is connected the RECEIVE signal which will be described hereinafter. Also, the DELETE "0" BIT signal is supplied through inverter 163 to gate 162. At Clock 5 time, if all inputs to the gate 162 are up, a SHIFT CRC signal is produced and provided to each of the stages 142 through 157. Of course, if the DELETE "0" BIT is positive, indicating that a "0" bit is to be deleted, gate 162 is blocked that bit time.

Reference is now made to the top of FIG. 8 for a description as to how the RECEIVE signal is produced. AND gate 164 is connected to receive the BIT CTR=8 signal from FIG. 6. At Clock 4 time, when the last mentioned signal is positive, gate 164 supplies a pulse to set latch 165. This latch was reset by gate 166 at Clock 4 time when the FLAG DETECT signal was produced. Output of the latch is the RECEIVE signal supplied to gate 162.

Once a flag sequence has been received and there is an indication that the next eight bits are not a flag sequence, the business machine that is to receive the data can be advised to begin taking bits. Thus, the RECEIVE signal is supplied to AND gate 167. The DELETE "0" BIT is supplied through inverter 168 to gate 167. Since at the beginning of the data field there will not be the necessity of deleting a "0" bit, gate 167 will produce a positive output at Clock 2 time to provide a BIT SERVICE REQUEST signal to the business machine or other utilization apparatus (not shown) that is to receive the data.

To provide the first bit of the data field to the business machine, the SHIFT REGISTER OUT signal is supplied to AND gate 169 and through inverter 170 to AND gate 171. The output of gate 171 will reset the latch 172 at Clock 2 time if the data bit is a "0" and gate 169 will set latch 172 if the data bit is a "1." Thus, from latch 172 is provided the BIT OUT signal for the business machine.

From the above, it will be seen that the BIT SERVICE REQUEST signal can advise the business machine that a data bit is present, and the BIT OUT signals represent that data.

When the flag sequence is detected at the end of the block check, the FLAG DETECT signal supplied to gate 166 will serve to reset latch 165 at Clock 4 time and the output of the latch goes negative. This latter output is supplied to AND gate 173 which also receives the FLAG DETECT signal. At Clock 2 time the gate 173 provides a positive output signal FRAME RCVD which is supplied to the business machine receiving the data.

Having gotten to the ending flag sequence, it is desirable to know whether a correct transmission has occurred. If it has, the stages 142 through 157 should have therein a predetermined number. This number is dependent on the particular non-zero number that was Exclusive OR'd to the output of the CRC accumulator 29 in the transmitter (FIG. 1). In the case of the present invention where the output of accumulator 29 is inverted, the shift register should read 1111000010111000, the bits from left to right indicating the conditions of stages 142 through 157, respectively.

To check on the accuracy of transmission, the outputs shown from stages 142 through 157 are connected to AND gate 174. If the above unique number appears in the shift register, all inputs to gate 174 will be positive to indicate a GOOD CRC signal. This signal is supplied through an inverter 175 to AND gate 176. This gate is supplied the RECEIVE signal and the FLAG DETECT signal. If a GOOD CRC is not indicated when the RECEIVE and FLAG DETECT inputs are positive, the output of inverter 175 will be positive and at Clock 2 time the output of gate 176 will indicate CRC ERROR. On the other hand, if a GOOD CRC is indicated at gate 174, gate 176 will be inhibited and not provide a positive CRC ERROR signal.

In summary, the operation of the receiver is such that after the flag sequence F is detected, the feedback shift register accumulator is preset to some non-zero number. In the implementation shown, it is preset to an all "1's" condition. This is the same as Exclusive OR'ing sixteen "1's" to the sixteen high order bits of the data field. Following receipt of all of the data bits and the block check field BC, the shift register will have a predetermined number therein if the transmission was error free. The time to look at the condition of the shift register is when the ending flag sequence is received, thereby indicating an end of frame. Since the bits supplied to the feedback shift register are delayed by eight bit times in the eight bit shift register shown in FIG. 7, the ending flag sequence is detected as the last bit of the frame preceding the ending flag sequence is received in the feedback shift register.

Thus, at the receiver we have shown how the received data field and block check field and any error pattern are decoded to produce a remainder of the quantity $$\frac{X^{n-k}[X^{n-k}\cdot G(X)\oplus R'(X)\oplus X^{k}K_1(X)\oplus E(X)]}{P(X)}$$

where E(X) is a polynomial representing the received error pattern. If E(X) is zero, thereby indicating no errors in transmission, the above remainder will equal $K_3(X)$ which is a polynomial representing the predetermined number remaining in the decoder shift register at the time a check is made to determine if correct transmission has occurred.

Referring now back to the examples in the earlier part of the specification, Example 1-A indicated a situation where the frame ending flag sequence was converted to all "0's," although the following flag sequence was detected. This would cause the feedback shift register in the receiver to receive eight extra "0" bits before the second flag sequence is detected. These eight extra "0's" would change the shift register from 1111000010111000 preceding receipt of the eight extra bits (assuming otherwise error free transmission) to 0011100100110011 following receipt of the extra eight "0" bits, as indicated below.

| Condition of Shift Register Prior to Receipt of Extra "0" Bits | 1111000010111000 |
|---|---|
| 1st extra "0" bit | 0111100001011100 |
| 2nd extra "0" bit | 0011110000101110 |
| 3rd extra "0" bit | 0001111000010111 |
| 4th extra "0" bit | 1000101100000011 |
| 5th extra "0" bit | 1100000110001001 |
| 6th extra "0" bit | 1110010011001100 |
| 7th extra "0" bit | 0111001001100110 |
| 8th extra "0" bit | 0011100100110011 |

In Example 1-B a single extra "0" bit was received prior to receipt of an erroneous flag sequence. In this case, the feedback shift register would have 0111100001011100 therein after receipt of said extra "0" and thereby indicate an error.

With regard to Example 2-A, the receiver feedback shift register will be at 0011100100110011 after receipt of the eight extra "0" bits. Since the condition of the shift register should be all "1's" prior to receiving the next frame, it will be seen that the condition of the shift register after receipt of the next frame will not have the proper number therein, i.e., 1111000010111000. Thus, an error will be indicated.

With regard to Example 2-B, the receiver feedback shift register will be at 0111100001011100 after receipt of the first extra zero bit. Therefore, when the one bit displaced flag sequence is detected and a check is made, a block check error will be detected. Therefore, when the receiver shift register is preset following receipt of the displaced flag sequence, there will be one less zero bit in that frame and the block check will not have the required number thereon to indicate error-free transmission.

Example 3-A presents a result similar to that in Example 2-A. The station receiving the first frame will receive the second frame that it was not intended to receive, but an error will be indicated at the end of the second frame. In normal practice the transmitting station can ascertain the last frame a particular receiving station received correctly. Apparatus for accomplishing this is not a part of this invention. It is pointed out simply to indicate that when the transmitting station ascertains that a particular transmission was not received, it will retransmit as the next frame that which followed the last that was correctly received. However, there is value to getting an error indication to preclude the acceptance of extraneous and redundant bits.

In Example 3-B, a two-bit error in the beginning flag sequence during transmission resulted in one less "0" bit in the received frame and thus did not result in providing the proper predetermined block check at the end of the frame, and an error is indicated.

From the above, it will be apparent to those skilled in the art that there are a variety of other situations where errors occur in or adjacent to the flag sequence that go undetected in the prior art systems, but which are detected by the present inventions.

While the present invention has been shown in one illustrative embodiment, it will be apparent to those skilled in the art that various changes in form and details may be made therein without departing from the spirit and scope of the invention.

What is claimed is:

1. A digital data transmission system for variable length digital information fields separated by one or more unique flags;

said system comprising a transmitter and a receiver adapted to communicate over an error-prone communication medium;

said transmitter including an encoder for generating block check fields from said information fields which are represented by the polynomial R'(X) in the equation $$R'(X)=[\text{Remainder } (X^{n-k}\cdot G(X) \oplus X^k K_1(X)/P(X))] \oplus K_2(X)$$

where

R'(X) is the polynomial representing the block check,

X is the dummy variable in the polynomial representation of bits,

*n* is the number of bits in the information and block check fields,

*k* is the number of bits in the information field,

G(X) is the polynomial representing the *k* information bits in the information field, $K_1(X)$ and $K_2(X)$ are each polynomials of degree less than $n-k$ representing non-zero constants, and P(X) is the generator polynomial of degree $n-k$;

means at said transmitter for supplying in sequence a flag, the information field, the block check field and one or more flags to said communication medium;

said receiver including a decoder for generating a block check remainder of the quantity $$[X^{n-k}\cdot G(X) \oplus R'(X) \oplus X^k K_1(X) \oplus E(X)]/P(X)$$

multiplied by an arbitrary power of X where E(X) is a polynomial representing a received error pattern; and means coupled to receive said block check remainder for determining whether a detectable error occurred during transmission.

2. A system as defined in claim 1, said transmitter further including means for detecting a predetermined bit sequence in the information and block check fields and inserting a bit therein to prevent the transmission of a flag in said fields, and said receiver including means for detecting said bits inserted at the transmitter and deleting them before they can be supplied to said decoder.

3. A system as defined in claim 1, in which the last mentioned means indicates that a detectable error occurred if said block check remainder is of a quantity other than that represented by a predetermined polynomial.

4. A system as defined in claim 3, said transmitter including means for inserting bits to prevent occurrence of a flag in the information and block check fields, and said receiver including means for deleting said inserted bits.

5. In a digital data transmission system for variable length data fields separated by one or more unique flags, said system comprising a transmitter and a receiver adapted to communicate over an error-prone communication medium, the method of detecting transmission errors occurring between said transmitter and receiver comprising the steps of;

generating a block check field at said transmitter which is represented by the polynomial R'(X) in the equation $$R'(X)=[\text{Remainder } (X^{n-k}\cdot G(X) \oplus X^k K_1(X)/P(X))] \oplus K_2(X)$$

where

R'(X) is the polynomial representing the block check,

X is the dummy variable in the polynomial representation of bits,

*n* is the number of bits in the data and block sheet fields,

*k* is the number of bits in the data field,

G(X) is the polynomial representing the *k* data bits in the data field, $K_1(X)$ and $K_2(X)$ are each polynomials of degree less than $n-k$ representing non-zero constants, and °(X) is the generator polynomial of degree $n-k$;

transmitting in sequence a flag, the data field, the block check field and one or more flags to said communication medium, generating a block check remainder at said receiver of the quantity $$[X^{n-k}\cdot G(X) \oplus R'(X) \oplus X^k K_1(X) \oplus E(X)]/P(X)$$

multiplied by an arbitrary power of X where E(X) is a polynomial representing a received error pattern, and determining from said block check remainder whether a detectable error occurred during transmission.

6. A method as in claim 5, in which a detectable error is indicated when said block check remainder is other than a predetermined non-zero polynomial.

* * * * *

UNITED STATES PATENT OFFICE

CERTIFICATE OF CORRECTION

PATENT NO. 3,872,430

DATED March 18, 1975

INVENTOR(S) Paul E. Boudreau et al

It is certified that error appears in the above-identified patent and that said Letters Patent are hereby corrected as shown below Title page, following names and addresses of inventors, insert "assignee: International Business Machines Corporation, Armonk, New York."

Column 20, line 28, change "sheet" to -- check --.

Column 20, line 35, change "°" to -- P --.

Signed and Sealed this

*Twenty-first* Day of *November 1978*

[SEAL]

*Attest:*

RUTH C. MASON
*Attesting Officer*

DONALD W. BANNER
*Commissioner of Patents and Trademarks*